(12) United States Patent
Nowitzki et al.

(10) Patent No.: US 10,683,868 B2
(45) Date of Patent: Jun. 16, 2020

(54) BUSHING ANTI-ROTATION SYSTEM AND APPARATUS

(71) Applicant: Halliburton Energy Services, Inc., Houston, TX (US)

(72) Inventors: Wesley John Nowitzki, Tulsa, OK (US); Joshua Wayne Webster, Owasso, OK (US); Randy S. Roberts, Tulsa, OK (US); Joseph Dean Butler, Tulsa, OK (US); John Vanderstaay Kenner, Houston, TX (US); Thomas John Gottschalk, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 267 days.

(21) Appl. No.: 15/651,907

(22) Filed: Jul. 17, 2017

(65) Prior Publication Data
US 2018/0017066 A1 Jan. 18, 2018

Related U.S. Application Data

(60) Provisional application No. 62/363,723, filed on Jul. 18, 2016.

(51) Int. Cl.
*F04D 29/04* (2006.01)
*F04D 29/041* (2006.01)
(Continued)

(52) U.S. Cl.
CPC ........... *F04D 29/04* (2013.01); *F04D 13/086* (2013.01); *F04D 13/10* (2013.01);
(Continued)

(58) Field of Classification Search
CPC .... F04D 29/04; F04D 29/0476; F04D 29/046; F04D 29/041; F04D 13/10
See application file for complete search history.

(56) References Cited

U.S. PATENT DOCUMENTS 1,642,914 A * 9/1927 Whann ................. F04D 29/047
  415/199.1
2,271,336 A 1/1941 Goldsmith
(Continued)

FOREIGN PATENT DOCUMENTS

CN 102606490 A 7/2012
WO 2014201458 A1 12/2014

OTHER PUBLICATIONS

Nowacki, J.et al., "Microstructure and characteristics of high dimension brazed joints of cermets and steel," Journal of Achievements in Materials and Manufacturing Engineering, Dec. 2009, vol. 37, Issue 2, 448-457, 10 pages.

*Primary Examiner* — Eldon T Brockman
*Assistant Examiner* — Wesley Le Fisher
(74) *Attorney, Agent, or Firm* — McGuireWoods, LLP.

(57) ABSTRACT

A bushing anti-rotation system and apparatus. A bushing anti-rotation system includes an impeller and diffuser stage including a rotatable shaft extending longitudinally through the stage, the diffuser having an inner diameter defining a bore, a bearing set including a bushing pressed into the inner diameter, and a rotatable sleeve inward of the bushing, and means for wedging the bushing against the inner diameter of the diffuser, wherein the means for wedging provides a mechanical lock against rotation of the bushing. The means for wedging the bushing against the diffuser includes one of a key wedged between an eccentric cavity in the diffuser and a notch in the bushing, a pin protruding from the diffuser against a flattened portion of the bushing, a square-shaped bushing secured into a square-shaped bore, a bent retaining ring having a bent end that wedges against a diffuser groove wall, or a combination thereof.

3 Claims, 11 Drawing Sheets

(51) Int. Cl.
  *F04D 13/08* (2006.01)
  *F04D 13/10* (2006.01)
  *F04D 29/22* (2006.01)
  *F16C 35/02* (2006.01)
  *F16C 17/10* (2006.01)

(52) U.S. Cl.
  CPC ......... *F04D 29/0413* (2013.01); *F04D 29/22* (2013.01); *F16C 35/02* (2013.01); *F05D 2260/37* (2013.01); *F16C 17/107* (2013.01); *F16C 2206/80* (2013.01); *F16C 2206/82* (2013.01); *F16C 2226/16* (2013.01); *F16C 2226/76* (2013.01); *F16C 2300/42* (2013.01); *F16C 2360/44* (2013.01)

(56) References Cited

U.S. PATENT DOCUMENTS

| | | | |
|---|---|---|---|
| 2,236,953 A | | 4/1941 | Schott |
| 2,678,606 A | | 5/1954 | Watson |
| 2,926,970 A | | 3/1960 | Clark |
| 3,170,646 A | | 2/1965 | Springer |
| 3,215,083 A | | 11/1965 | Sarles et al. |
| 3,267,869 A | | 8/1966 | Vartapetov et al. |
| 3,537,163 A | * | 11/1970 | Steidl .................. B25B 27/20 29/898.07 |
| 3,945,695 A | | 3/1976 | Speakman |
| 3,975,117 A | | 8/1976 | Carter |
| 4,175,755 A | * | 11/1979 | Geary .................. F16J 15/441 277/422 |
| 4,227,104 A | * | 10/1980 | Hamman ................ F16C 35/02 310/75 R |
| 4,244,675 A | | 1/1981 | Bower |
| 4,318,573 A | * | 3/1982 | Hamman ................ F16C 35/02 384/192 |
| 4,513,215 A | | 4/1985 | Del Serra |
| 4,515,993 A | | 5/1985 | MacKenzie |
| 4,781,531 A | | 11/1988 | James |
| 4,907,814 A | * | 3/1990 | Foster .................. B65G 39/09 280/104 |
| 5,128,573 A | * | 7/1992 | Liu ........................ H02K 5/167 310/87 |
| 5,160,240 A | | 11/1992 | Wilson |
| 5,184,945 A | | 2/1993 | Chi-Wei |
| 5,207,560 A | | 5/1993 | Urban |
| 5,209,577 A | | 5/1993 | Swatek |
| 5,320,431 A | | 6/1994 | Kallenberger |
| 5,722,812 A | | 3/1998 | Knox et al. |
| 5,765,950 A | | 6/1998 | Eno et al. |
| 5,845,709 A | | 12/1998 | Mack et al. |
| 5,881,830 A | | 3/1999 | Cooley |
| 6,017,184 A | | 1/2000 | Aguilar et al. |
| 6,068,444 A | | 5/2000 | Sheth |
| 6,106,224 A | | 8/2000 | Sheth et al. |
| 6,145,608 A | | 11/2000 | Lund et al. |
| 6,167,965 B1 | | 1/2001 | Bearden et al. |
| 6,309,174 B1 | | 10/2001 | Oklejas, Jr. et al. |
| 6,547,514 B2 | | 4/2003 | Lee |
| 6,676,366 B2 | | 1/2004 | Kao |
| 6,861,098 B2 | | 3/2005 | Griffin et al. |
| 7,530,391 B2 | | 5/2009 | Hall et al. |
| 7,549,837 B2 | | 6/2009 | Hackworth et al. |
| 7,575,413 B2 | | 8/2009 | Semple et al. |
| 7,909,090 B2 | | 3/2011 | Reid |
| 8,066,476 B2 | | 11/2011 | Orban et al. |
| 8,070,426 B2 | | 12/2011 | Brunner et al. |
| 8,277,124 B2 | | 10/2012 | Sexton et al. |
| 8,287,235 B2 | | 10/2012 | Orban et al. |
| 8,303,188 B2 | * | 11/2012 | Otsuka .................. F16C 25/083 384/537 |
| 8,400,035 B2 | | 3/2013 | Watson |
| 8,491,277 B2 | | 7/2013 | Kawabata et al. |
| 8,651,836 B2 | | 2/2014 | Parmeter et al. |
| 8,684,679 B2 | | 4/2014 | Tetzlaff et al. |
| 8,721,181 B2 | | 5/2014 | Semple et al. |
| 8,894,350 B2 | | 11/2014 | Brunner et al. |
| 9,017,043 B2 | | 4/2015 | Parmeter et al. |
| 9,039,356 B1 | | 5/2015 | Nowitzki et al. |
| 9,200,642 B2 | | 12/2015 | Nowitzki et al. |
| 9,325,216 B2 | | 4/2016 | Parmeter et al. |
| 9,353,752 B2 | | 5/2016 | Tetzlaff et al. |
| 9,353,753 B2 | | 5/2016 | Wilson et al. |
| 2004/0057642 A1 | | 3/2004 | New |
| 2008/0061645 A1 | * | 3/2008 | Yukitake .................. F04C 15/008 310/89 |
| 2009/0052826 A1 | * | 2/2009 | Himeda .................. F16C 33/586 384/515 |
| 2012/0020777 A1 | | 1/2012 | Eslinger |
| 2013/0017075 A1 | | 1/2013 | Drban et al. |
| 2013/0209225 A1 | | 8/2013 | Eslinger |
| 2013/0259545 A1 | * | 10/2013 | Hata ...................... F16C 33/04 399/328 |
| 2014/0030055 A1 | | 1/2014 | Jayaram et al. |
| 2014/0050570 A1 | | 2/2014 | Jayaram et al. |
| 2015/0023815 A1 | * | 1/2015 | Tetzlaff .................. F04D 1/04 417/365 |
| 2015/0075877 A1 | | 3/2015 | Setlur et al. |
| 2015/0152877 A1 | | 6/2015 | Jayaram et al. |
| 2015/0211527 A1 | | 7/2015 | St. John et al. |
| 2015/0226219 A1 | * | 8/2015 | Johnson .................. F04D 1/06 417/423.3 |
| 2015/0256043 A1 | * | 9/2015 | Perisho .................. H02K 7/08 384/215 |
| 2015/0354571 A1 | * | 12/2015 | Sun ...................... F04C 29/0078 418/55.1 |
| 2016/0115998 A1 | | 4/2016 | Jayaram et al. |
| 2017/0058616 A1 | | 3/2017 | Lunk et al. |
| 2017/0138395 A1 | * | 5/2017 | Lai ........................ F16C 19/507 |
| 2017/0159668 A1 | | 6/2017 | Nowitzki et al. |
| 2017/0254351 A1 | * | 9/2017 | Rooks .................. F16B 21/183 |

\* cited by examiner

BUSHING ANTI-ROTATION SYSTEM AND APPARATUS

CROSS REFERENCE TO RELATED APPLICATIONS

This application claims the benefit of U.S. Provisional Application No. 62/363,723 to Nowitzki et al., filed Jul. 18, 2016 and entitled "BUSHING ANTI-ROTATION SYSTEM AND APPARATUS," which is hereby incorporated by reference in its entirety.

BACKGROUND OF THE INVENTION

1. Field of the Invention

Embodiments of the invention described herein pertain to the field of electric submersible pump bearings. More particularly, but not by way of limitation, one or more embodiments of the invention enable a bushing anti-rotation system and apparatus.

2. Description of the Related Art

Fluid, such as gas, oil or water, is often located in underground formations. In such situations, artificial lift is often used to pump fluid to the surface so that the fluid can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser. A rotating shaft runs through the central hub of the impeller and diffuser. A motor upstream of the pump turns the shaft of the pump motor. The shaft of the pump motor turns the pump shaft by splined shaft connections, and the impeller is keyed to the pump shaft, causing the impeller to rotate with the shaft. In multistage centrifugal pumps, multiple impeller and diffuser stages are stacked around the pump shaft, with each successive impeller sitting on a diffuser of the previous stage.

A conventional vertical ESP assembly includes, from bottom to top, a motor, seal section, intake section, and multi-stage centrifugal pump. Production tubing carries the pumped fluid from the centrifugal pump to the well's surface. The assembly components each have a shaft running longitudinally through their centers that are connected and rotated by the motor. In gassy wells, a gas separator or charge pump may also be included in the assembly, typically between the intake and the pump, or in place of the intake. For example, a gas separator may act as the intake of the assembly. In such instances, the gas separator compresses the gaseous fluid and then attempts to separate any unsaturated gas before the fluid passes into the centrifugal pump. Gas separators sometimes include impeller and diffuser stages to increase the pressure of the fluid during compression and separation of gases. Similarly, charge pumps are also sometimes used in tandem with a primary centrifugal pump in gassy wells, and may also employ stages.

During operation, whether in a pump, charge pump or gas separator, pump assembly stages are subject to thrust and radial forces. Downthrust or downward force results from impeller discharge pressure acting on the top of the impeller. Upthrust or upward force results from impeller discharge pressure acting against the bottom of the impeller and is also produced by the momentum of the production fluid making its turn in the impeller passageway. Radial forces cause misalignment of the pump shaft and can be particularly damaging in long pump assemblies with hundreds of stages.

To carry the thrust of the pump and provide radial support, bearings are sometimes employed in pump stages. The bearings include a bushing and sleeve that form a bearing set. The bushing is pressed into the wall of the diffuser and should not rotate. The sleeve is keyed to the pump shaft inward of the stationary bushing and rotates with the shaft. As the shaft rotates along with the sleeve, a thin layer of fluid forms in between the rotating sleeve and stationary bushing, providing hydrodynamic lift. The hydrodynamic benefits of the bearing set depend upon the bushing remaining static as the sleeve rotates within the bushing. If the bushing rotates, the bearings fail to provide support to the pump, which can lead to pump failure.

Typically, bushings are tightly pressed into the diffuser bore with an interference fit. The outer diameter of the bushing is larger than the diffuser bore, typically by about 0.001-0.003 inches, and is inserted using a lead in chamfer. Frictional forces between the bushing and the surrounding diffuser attempt to keep the bushing from rotating, despite rotation of the shaft and sleeve. However, in many instances the rotational load will overcome the frictional force between the bushing and the diffuser, causing the bushing to spin.

Commonly, the frictional force will fail as the temperature of the pump increases and/or where the production fluid has a high gas to liquid ratio (GLR). For example, in high temperatures such as 550° F. or 600° F., the material of the bushing may expand more slowly than that of the diffuser, causing the press-fit to loosen. Conventionally, diffusers are made of Ni-resist iron, and bushings are made of a composite material such as tungsten carbide, silicon carbide or titanium carbide. The Ni-resist diffuser has a much higher thermal expansion coefficient than the composite bushing, causing the diffuser to expand faster than the bushing press-fit into the diffuser. The result is that the press fit on the bushing relieves and the bushing rotates. In another example, a high GLR, such as 10% or greater, may cause gas bubbles that cause the pump to run hotter, which can lead to bushing rotation. Once the bushing rotates, pump misalignment and the absence of adequate thrust support can cause pump failure.

Compliant bearings employed in ESP pumps suffer from similar difficulties. With compliant bearings, an elastomeric ring sits around the outer diameter (OD) of the bushing, between the diffuser and the bushing. The bushing is permitted to move axially, but like press-fit bearings, they must not spin. At higher temperatures, the elastomeric ring may soften, causing the compliant bearing to undesirably rotate. Production fluid with high gas content may also adversely affect the ability of the compliant bushing to keep from spinning.

As is apparent from the above, current approaches to prevent bushing rotation in ESP stages are inadequate. Therefore, there is a need for an improved bushing anti-rotation system and apparatus.

BRIEF SUMMARY OF THE INVENTION

One or more embodiments of the invention enable a bushing anti-rotation system and apparatus.

A bushing anti-rotation system and apparatus is described. An illustrative embodiment of a bushing anti-rotation system includes a centrifugal pump stage including an impeller and a diffuser, the impeller secured to a rotatable shaft extending longitudinally through the centrifugal pump stage, the diffuser having an inner diameter defining a bore, a bearing set including a bushing pressed into the inner diameter of the diffuser, and a rotatable sleeve inward of the bushing, the rotatable sleeve keyed to the rotatable shaft, and means for wedging the bushing against the inner diameter of the diffuser, wherein the means for wedging provides a mechanical lock against rotation of the bushing. In some embodiments, the means for wedging the bushing against the inner diameter of the diffuser includes a key extending at least partially into an eccentric cavity in the inner diameter of the diffuser and at least partially into a notch in an outer diameter of the bushing. In certain embodiments, the means for wedging the bushing against the inner diameter of the diffuser includes a pin protruding inward from the inner diameter of the diffuser, a flattened portion on an outer diameter of the bushing, and the flattened portion of the bushing wedgeable against the pin. In some embodiments, a corner of the flattened portion of the bushing is wedgeable against the pin. In certain embodiments, the means for wedging the bushing against the inner diameter of the diffuser includes a squared bushing press fit into the bore, the squared bushing including a plurality of sides and a plurality of corners, the bore having a squared shape that mates with the squared bushing. In some embodiments, the means for wedging the bushing against the inner diameter of the diffuser includes a retaining ring seated around an outer diameter of the bushing, the retaining ring seated partially in a bushing groove and partially in a diffuser groove, the bushing groove having a cratered portion and the diffuser groove having a stepped portion, the stepped portion of the diffuser groove forming an axially extending wall of the diffuser groove, the retaining ring including a circumferential portion and at least one bent end, the at least one bent end extending into the cratered portion and the stepped portion, and the at least one bent end wedgeable against the axially extending wall of the stepped portion.

An illustrative embodiment of a bushing anti-rotation system includes an electric submersible pump assembly stage including an impeller and a diffuser, the impeller secured to a rotatable shaft extending longitudinally through the stage, the diffuser having an inner diameter defining a bore, the inner diameter having an eccentric cavity, a bushing coupled to the diffuser, the bushing having a notch on an outer diameter, the notch opposing the eccentric cavity, and a key extending at least partially into the eccentric cavity on a first side and at least partially into the notch on a second side, the key wedgeable inside the eccentric cavity and the notch. In some embodiments, the bushing is paired with a sleeve keyed to the rotatable shaft to form a bearing set. In certain embodiments, the key wedges during initial rotation of the bushing to provide a mechanical lock against bushing rotation beyond the initial rotation. In some embodiments, the eccentric cavity is semicircular around a cavity center, the cavity center offset from a center of the bore. In certain embodiments, the bushing is press-fit into the diffuser bore. In some embodiments, the bushing is compliant and includes at least one elastomeric ring around the outer diameter of the bushing. In certain embodiments, the bushing is coupled to the diffuser proximate a bottom of the bore.

An illustrative embodiment of a bushing anti-rotation system includes a diffuser of a stage of an electric submersible pump assembly, the diffuser including an inner diameter, the inner diameter defining a diffuser bore, and a pin protruding inward from the inner diameter into the bottom of the diffuser bore, and a bushing including an outer diameter, the outer diameter including a flattened portion, the flattened portion of the bushing opposing the pin of the diffuser, the flattened portion rotatable between a parallel position wherein an outer edge of the pin parallels the flattened portion of the bushing, and a wedged position wherein a corner of the pin wedges against the flattened portion of the bushing. In some embodiments, the bushing outer diameter is pressed to the diffuser inner diameter by interference fit. In some embodiments, the bushing is compliant and includes an elastomeric ring around the outer diameter of the bushing above the flattened portion. In certain embodiments, the pin and flattened portion together form an anti-rotation wedge for the bushing.

An illustrative embodiment of a bushing anti-rotation system includes a diffuser of a stage of an electric submersible pump assembly, the diffuser having a bore, the bore having a square-shaped portion proximate a bottom of the bore, a bushing having a squared-shaped outer diameter secured into the square-shaped portion of the bore, and the bushing having a round inner diameter, the round inner diameter extending around a rotatable sleeve inward of the bushing. In some embodiments, the outer diameter of the bushing includes four flattened sides and four rounded corners that mate with complementary sides and corners of the square-shaped portion of the bore.

An illustrative embodiment of a bushing anti-rotation system includes a diffuser having an inner diameter defining a diffuser bore, the inner diameter having a first retaining ring groove including a first circumferential portion and a stepped portion, the stepped portion forming an open space bounded by a pair of axially extending groove walls, a bushing coupled to the inner diameter of the diffuser, the bushing having an outer diameter facing the inner diameter of the diffuser, the outer diameter of the bushing having a second retaining ring groove including a second circumferential portion and a cratered portion extending axially from the second circumferential portion, the first retaining ring groove positioned opposite the second retaining ring groove such that the cratered portion aligns with the stepped portion, a retaining ring seated at least partially in the first retaining ring groove and at least partially in the second retaining ring groove, the retaining ring including at least one bent end, the at least one bent end extending at least partially into the cratered portion and at least partially into the open space, and the at least one bent end wedgeable against at least one axially extending wall of the pair of axially extending groove walls. In some embodiments, the at least one bent end wedged against the at least one axially extending wall creates a mechanical lock that resists rotation of the bushing by wedging an outer diameter of the bushing to an inner diameter of the diffuser.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A bushing anti-rotation system and apparatus are described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a key includes one or more keys.

"Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of the electric submersible pump (ESP) and/or the opening of a component through which the shaft would extend. In the art, "outer diameter" and "outer circumference" are sometimes used equivalently. As used herein, the outer diameter is used to describe what might otherwise be called the outer surface of a pump component such as a bushing.

As used herein, the term "inner", "inside" or "inward" means the radial direction toward the center of the shaft of the ESP and/or the opening of a component through which the shaft would extend. In the art, "inner diameter" and "inner circumference" are sometimes used equivalently. As used herein, the inner diameter is used to describe what might otherwise be called the inner surface of a pump component, such as a bushing.

As used herein the terms "axial", "axially", "longitudinal" and "longitudinally" refer interchangeably to the direction extending along the length of the shaft of an ESP assembly component such as a multi-stage centrifugal pump, seal section, gas separator or charge pump.

"Downstream" refers to the direction substantially with the principal flow of working fluid when the pump assembly is in operation. By way of example but not limitation, in a vertical downhole electric submersible pump (ESP) assembly, the downstream direction may be towards the surface of the well. The "top" of an element refers to the downstream-most side of the element.

"Upstream" refers to the direction substantially opposite the principal flow of working fluid when the pump assembly is in operation. By way of example but not limitation, in a vertical downhole ESP assembly, the upstream direction may be opposite the surface of the well. The "bottom" of an element refers to the upstream-most side of the element.

As used herein, "square" refers to square-like shapes, such as a circle with four flattened sides, a square with rounded corners, a squircle, and/or a traditional square shape.

Illustrative embodiments described herein may mechanically lock a stationary member of a thrust and/or radial support bearing set against rotation, by wedging the outer diameter of the stationary member against the inner diameter of the diffuser. Illustrative embodiments may provide a mechanical lock against bushing rotation despite high operating temperatures, such as 550° F. or 600° F. and/or high gas to liquid ratio (GLR) such as 10% or higher, circumstances under which the stationary member would conventionally and undesirably dislodge. Certain embodiments may be utilized with readily available parts and at a low cost, increasing efficiency and run life of an ESP pump assembly making use of the bearings of illustrative embodiments. Illustrative embodiments may provide an improvement over conventional assemblies by allowing low installation and/or capital cost while reducing the likelihood of bushing rotation, thereby maintaining thrust and/or radial support to a pump, charge pump or gas separator making use of the anti-rotation system of illustrative embodiments, over a wider temperature range and GLR.

An illustrative embodiment of a bushing anti-rotation system may include a bushing keyed to a diffuser. The key may provide a mechanical lock between the diffuser and the bushing. The key may wedge the bushing against the diffuser and reduce or prevent bushing rotation. The diffuser may have an eccentric pocket cut into the diffuser's inner diameter (ID). The outer diameter (OD) of the bushing may be notched proximate and/or opposite the eccentric pocket. A key may be inserted with one side in the eccentric pocket and another side in the notch. The key may be trapped in place such that should the bushing begin to rotate, the key may be become wedged between opposing bushing and diffuser surfaces. In another example, the diffuser of illustrative embodiments may include a pin extending inwards from the ID of the diffuser. The diffuser pin may have an outer edge that parallels a flattened portion on the surface of the OD of the bushing. Should the bushing begin to rotate, a corner of the pin may wedge against the flattened portion on the outer surface of the bushing, forming an anti-rotation lock. In yet another example, the bushing may have a square OD that mates with the inner diameter of a diffuser having a square ID. The corners and/or flattened sides of the squared bushing may wedge against the inner diameter of the diffuser to combat rotation of the bushing.

Illustrative embodiments may include a retaining ring groove extending circumferentially around the OD of a bushing. The circumferential groove may include a cratered portion that extends axially from the circumferential groove. The ID of the diffuser, near the bottom of the bore, may have a corresponding circumferential groove having an axial step in the groove that forms an open space defined by groove walls. A retaining ring may be seated inside the circumferential grooves of both the bushing and diffuser. The retaining ring may be open-ended such that it does not form a complete circle. An end of the retaining ring may be bent upwards or downwards to seat within the cratered portion of the bushing groove and the stepped portion of the diffuser groove. The bent end of the retaining ring may abut against the wall of the stepped portion preventing rotation of the bushing with respect to the diffuser, by wedging the bent end against the wall of the stepped portion. The circumferential portion of the retaining ring may assist in preventing axial movement of the bushing, while the axial portion (bent end) of the retaining ring, secured in the stepped portion of the diffuser groove, may assist in preventing bushing rotation.

The anti-rotation system and apparatus of illustrative embodiments may be employed in stages of an ESP assembly such as a multi-stage centrifugal pump, charge pump or gas separator. The bushing of illustrative embodiments may be press-fit into a diffuser or carrier, or may be a compliant bearing. For ease of description, the invention is primarily described in terms of a bushing press-fit into a diffuser of an ESP pump. However, the invention is not so limited and may be employed in any mixed flow or radial flow pump including bearings, whether press-fit or compliant, that may benefit from the anti-rotation protection of illustrative embodiments.

Figure 1:
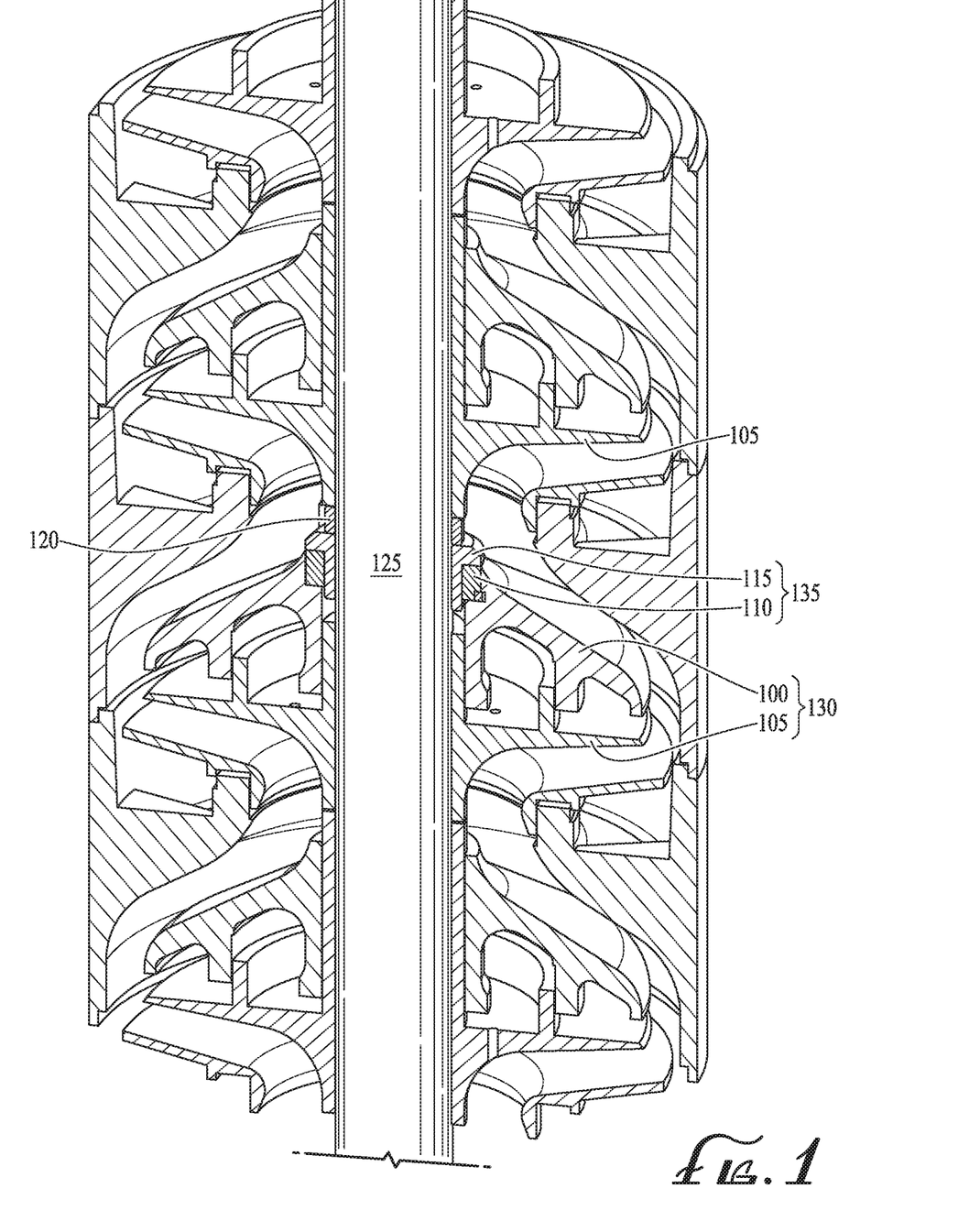
FIG. 1 is a cross sectional view of an exemplary stage of an electric submersible pump assembly of an illustrative embodiment.

Illustrative embodiments may be employed in one or more stages and/or in any location where a thrust and/or radial support bearing set may be employed in an ESP pump assembly. FIG. 1 illustrates an ESP stage of an illustrative embodiment. Stages 130 may be stacked one above the other around shaft 125, with each stage 130 including a nonrotating diffuser 100 paired with rotatable impeller 105. Bearing set 135 may be included within stage 130 to provide thrust and/or radial support and may include rotatable sleeve 115 mated with bushing 110. Bearing set 135 may be abrasion resistant trim and may be made of tungsten carbide, silicon carbide or titanium carbide. Sleeve 115 and impeller 105 may be secured to shaft 125, such as by key, and may rotate with shaft 125. Diffuser 100 and bushing 110 should not rotate. Bushing 110 may be pressed into diffuser 100 by interference fit or may be a compliant bearing that employs elastomeric rings 500 (shown in FIG. 5) to maintain a clearance between bushing 110 and diffuser 100. Sleeve 115 may include a flange to provide thrust support and/or carry axial loads. Standoff sleeve 120 may support impeller 105, and the length of standoff sleeve 120 may determine the operating height of impeller 105. Standoff sleeve 120 may be a Ni-resist austenitic cast iron alloy or stainless steel if shimmed.

Illustrative embodiments may provide a bushing anti-rotation system that wedges the bushing against the inner diameter of the diffuser to combat rotation. Several means for wedging bushing 110 against diffuser 100 are provided for herein, features of which may be used alone or in combination. The wedge of illustrative embodiments may become activated and/or locked into place upon initial rotation of bushing 110. Thus, initial slight rotation of bushing 110, such as a fraction of a revolution, may lock the wedge of illustrative embodiments, thereby preventing further rotation beyond the initial rotational motion.

A Key Wedge

Figure 2:
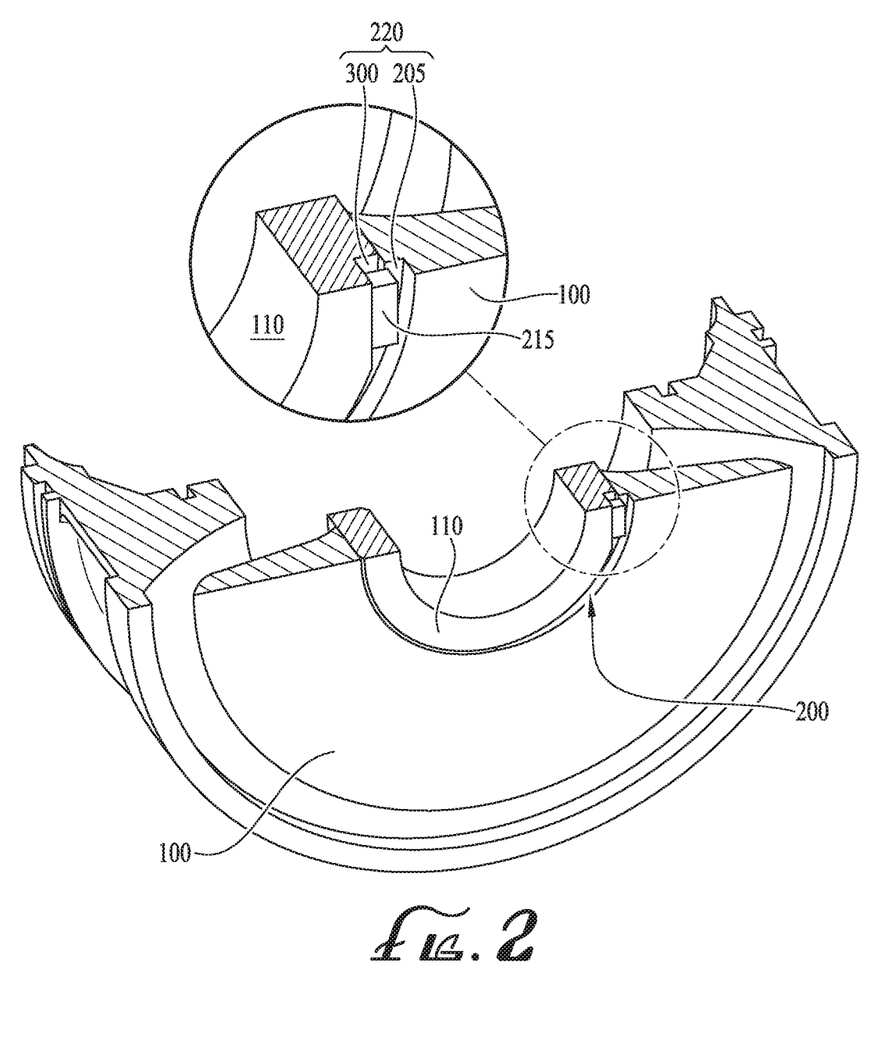
FIG. 2 is a perspective cross sectional view of a bushing-to-diffuser key system of an illustrative embodiment.
Figure 4:
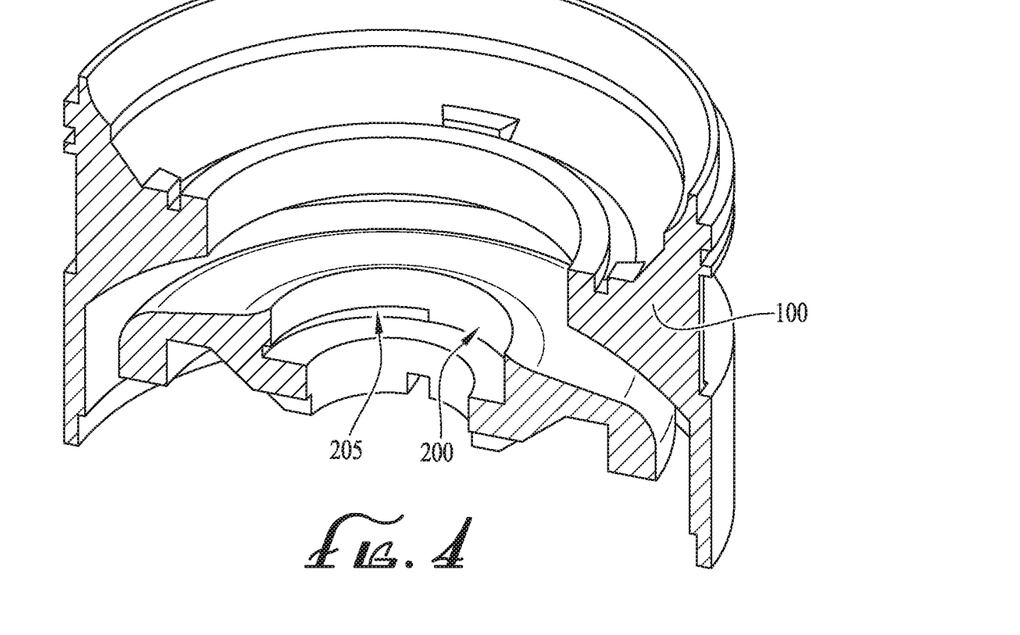
FIG. 4 is a perspective cross sectional view of a diffuser with an eccentric cut of an illustrative embodiment.

FIG. 2 shows a key-type wedge system of an illustrative embodiment. Diffuser 100, which may be a diffuser or carrier, has central bore 200 with cavity 205 extending radially into the ID of the diffuser 100. Cavity 205 may be a cavity, pocket, notch, cutout or indentation that provides bore 200 with an irregular shape. As shown in FIG. 4, cavity 205 may extend partially around and/or into diffuser inner diameter 705 (shown in FIG. 7) at and/or proximate the location where bushing 110 may be secured. Cavity 205 may be semicircular in shape around a center point that is offset from the center of bore 200, making cavity 205 eccentric to bore 200. For example, the center used to define the circular curve of cavity 205 may be offset from the center of bore 200 by ⅛ inch, 1/10 inch or ⅙ inch. Cavity 205 may be a rounded or rectangular groove or pocket extending partially around the circumference and/or into bore 200, such as 20°, 30° or 45° around diffuser bore 200. The eccentric feature of cavity 205 may result in radial nonuniformity of cavity 205. For example, where cavity 205 is a semicircle eccentric to bore 200, cavity 205 may extend further outward into diffuser wall 705 in the middle of the cavity 205, and then symmetrically become shallower on both sides of middle similar to a "V" or "U" shape. Diffuser 100 may be cast, cut, and/or machined to form cavity 205 that may be a pocket extending into the wall of inner diameter 705 of diffuser 100.

Figure 3:
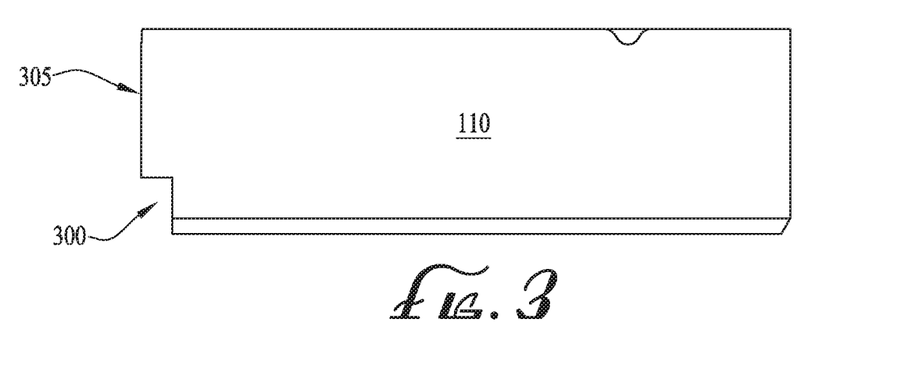
FIG. 3 is a side elevation view of a notched bushing of an illustrative embodiment.

Returning to FIG. 2, bushing 110 may be secured against diffuser 100. For example, bushing 110 may be press fit into diffuser 100 or may be a compliant bearing coupled to diffuser 100 with elastomeric rings 500 (shown in FIG. 5) between the outer diameter of bushing 110 and the inner diameter of diffuser 100. A shown in FIG. 3, a section of bushing 110 may be notched, flattened and/or cut away. Notch 300 may be a cut, indentation and/or flattened portion on the outer diameter 305 of bushing 110. Notch 300 may be positioned at a bottom corner, top corner, or another location along outer diameter 305 of bushing 110, but notch 300 should be situated to substantially oppose cavity 205 when bushing 110 is positioned within diffuser 100. Notch 300 may extend partially around outer diameter 305 of bushing 110. In some embodiments, notch 300 may extend a smaller portion of the circumference of bushing 110, than the portion of the circumference of diffuser 100 around which cavity 205 extends. For example, if cavity extends 20° around the inner diameter of diffuser 100, then notch 300 may extend 10° around outer diameter 305 of bushing 110. Notch 300 may be a flattened portion of outer diameter 305 of bushing 110 or may be a rectangular or rounded incision into, or a molded feature of, the surface of outer diameter 305.

As shown in FIG. 2, bushing may be pressed into and/or otherwise secured into position within diffuser bore 200 such that notch 300 is arranged opposite to cavity 205. Key 215 may be placed into cavity 205 prior to press fit and/or may be placed into recess 220 formed by notch 300 and its opposing cavity 205. Key 215 may fits snugly at least within the widest portion of recess 220, but as recess 220 narrows due to the eccentric quality of cavity 205 and/or notch 300, key 215 may be too large for the narrower portions of recess 220, such that key 215 becomes wedged in recess 220 should bushing 110 begin to rotate. Key 215 may be wedged, secured, trapped, inserted and/or placed within cavity 205 in the ID of diffuser 100 and notch 300 of bushing 110, with key 215 extending partially into cavity 205 and partially into notch 300. Key 215 may be rectangular in shape (rectangular prism), similar to other keys used within ESP systems, such as a shaft-to-sleeve key, but shorter in length. Key 215 may extend lengthwise or widthwise as it extends between bushing 110 and diffuser 100. A lengthwise orientation for key 215, as for example illustrated in FIG. 2, may provide better shear resistance.

Figure 5:
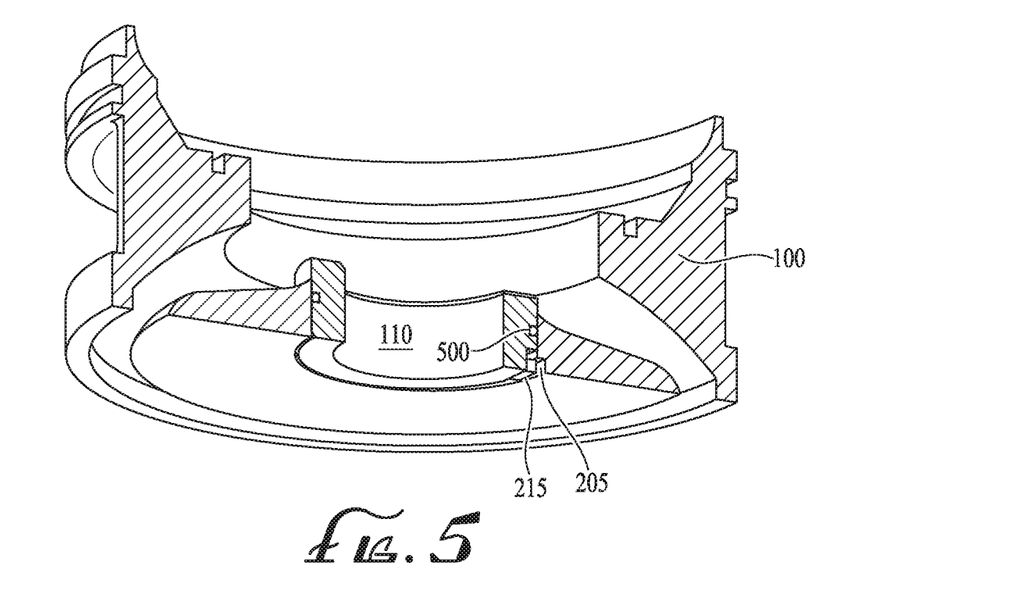
FIG. 5 is a perspective cross sectional view of a diffuser with keyed bushing of an illustrative embodiment.

Key 215 may be steel, carbide, an austenite metal-based alloy, or another material with similar properties. Key 215 may be similar to the type of key employed to secure an impeller or sleeve to a pump shaft, but shortened in length, for example shortened to about 0.50 inches in length, depending on the type and size of bushing 110 and/or diffuser 100 in which the key 215 may be employed. Key 215 may be installed such that its length extends in a circumferential direction between bushing 110 and diffuser 100. In press fit embodiments, key 215 may be installed by first placing a first side of key 215 into cavity 205 before pressing bushing 110 into bore 200. During insertion of bushing 110, notch 300 may be aligned with the opposing second side of key 215. FIG. 5 illustrates key 215 installed in cavity 205 and notch 300 on a bottom side of bushing 110. In the example of FIG. 5, bushing 110 is a compliant bearing that includes one or more elastomeric rings 500 around bushing 110 outer diameter, between bushing 110 and diffuser 100.

Figure 6A:
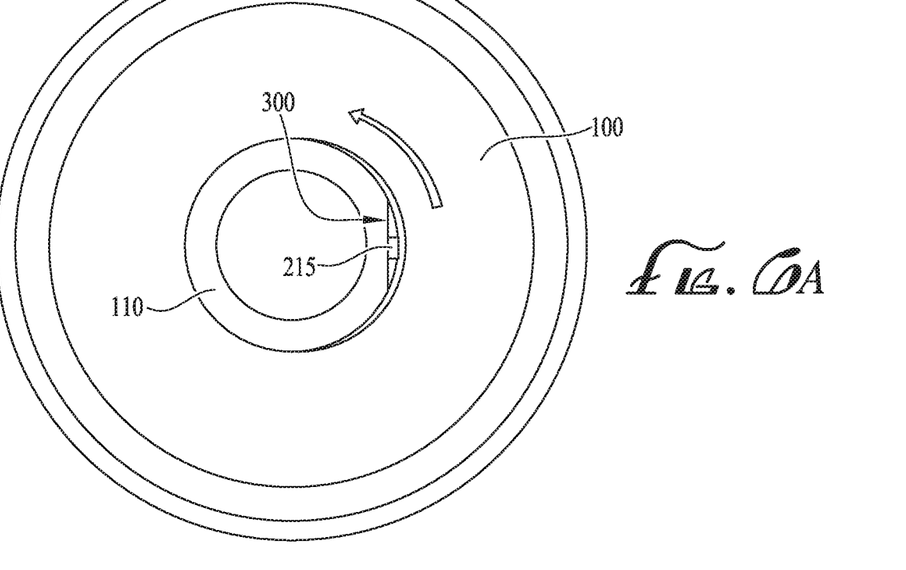
FIG. 6A is a bottom plan view of a bushing-to-diffuser key system of an illustrative embodiment prior to wedging of a key.
Figure 6B:
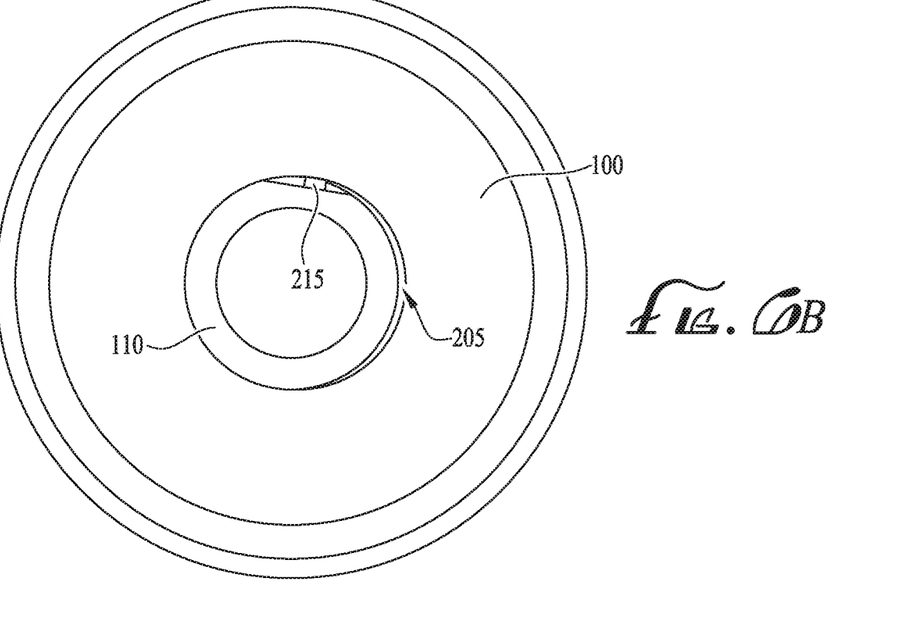
FIG. 6B is a bottom plan view of bushing-to-diffuser key system of an illustrative embodiment with wedged key.

FIG. 6A and FIG. 6B illustrate wedging of key 215 as bushing 110 attempts to rotate. Key 215 may be squeezed inside notch 300 and cavity 205 during press-fit and/or insertion of bushing 110 against diffuser 100. FIG. 6A illustrates an exemplary key-type bushing anti-rotation system after installation and/or during normal operation of stages 130, where bushing 110 has remained rotationally stationary. In such instances, the press fit of, or elastomeric rings 500 around, bushing 110 may successfully resist rotation of bushing 110. Should temperatures elevate, gas content rise and/or bushing 110 otherwise loosen, bushing 110 may begin to rotate a portion of a rotation. As bushing 110 begins an initial rotation, key 215 may slide along cavity 205 while cavity 205 decreases in size and/or depth, until key 215 is so tightly constrained that key 215 wedges inside recess 220 and/or cavity 205. FIG. 6B illustrates bushing 110 that has rotated about 90° counterclockwise along with a counterclockwise rotating shaft 125 and/or sleeve 115. After less than 90° of rotation, about 90° of rotation or a fraction of a rotation, key 215 has become wedged against diffuser 100, thereby preventing any further rotational movement of bushing 110. Wedging of key 215 may provide a mechanical lock that allows bushing 110 to resist rotation beyond an initial fraction of a revolution. Wedging of key 215 may be similar to wedging of a doorstop beneath a door.

An Integral Pin Wedge

Figure 7:
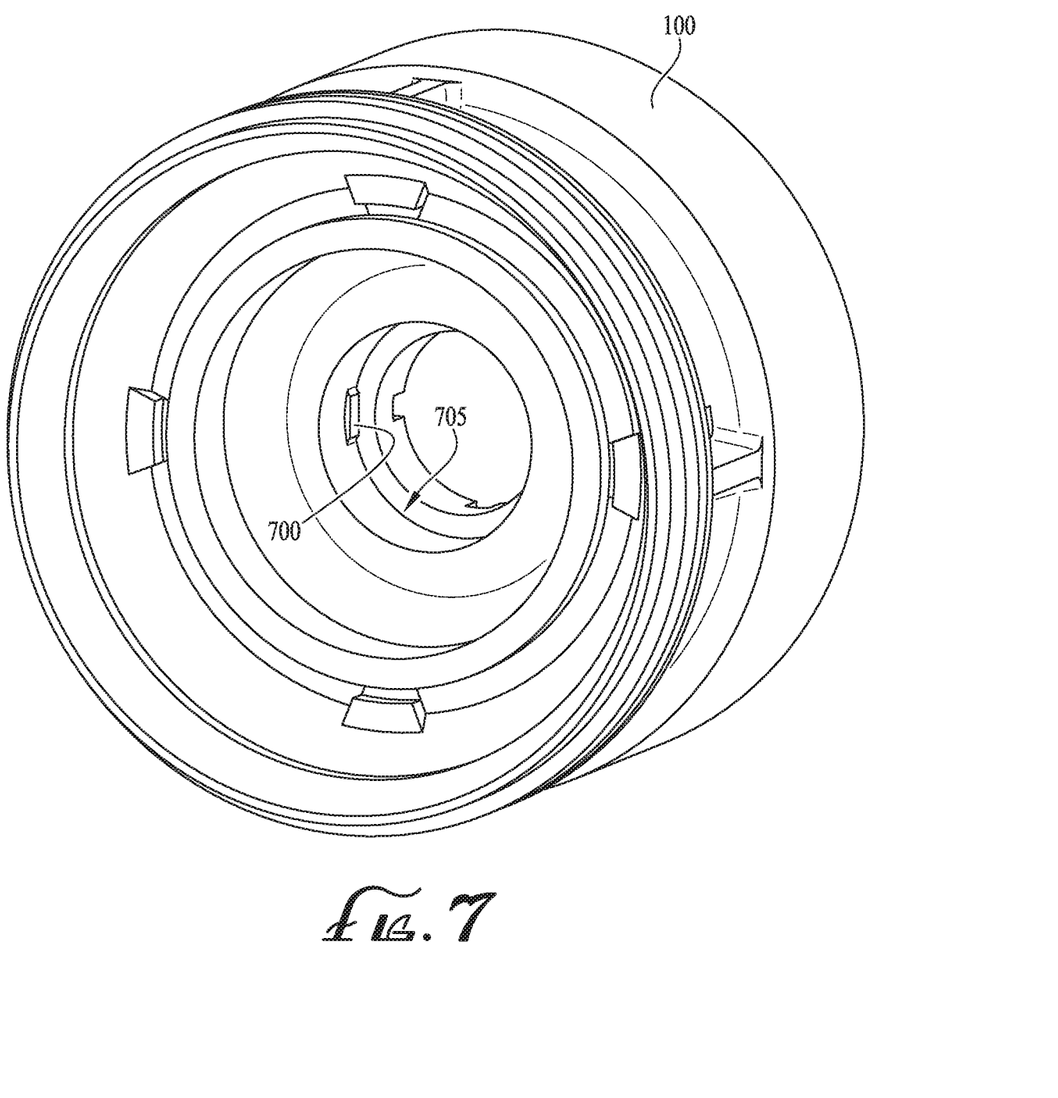
FIG. 7 is a perspective view of a diffuser with a pin of an illustrative embodiment.
Figure 8A:
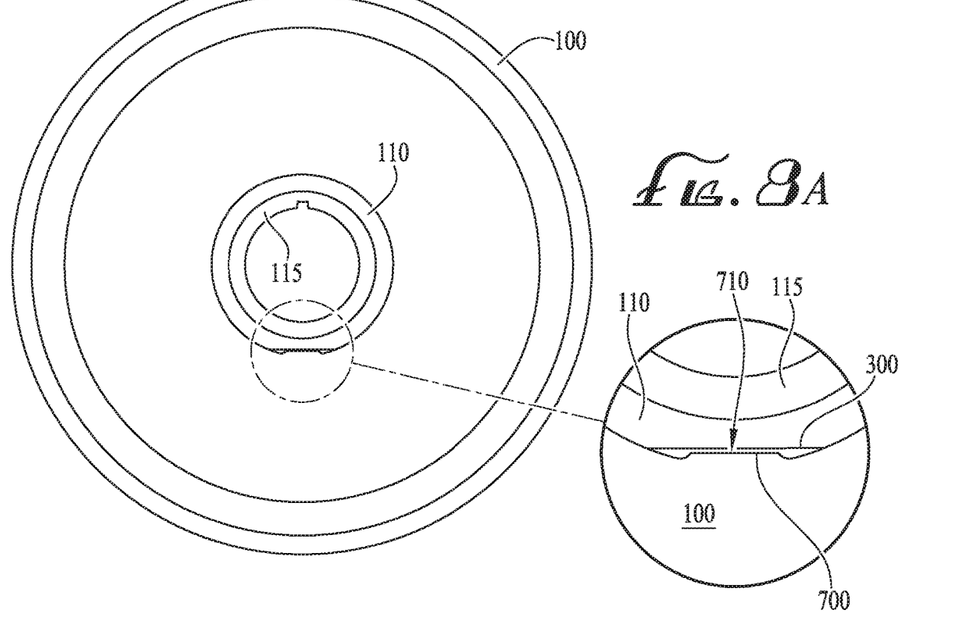
FIG. 8A is a bottom plan view of a bushing anti-rotation system of an illustrative embodiment prior to wedging of a diffuser pin.
Figure 8B:
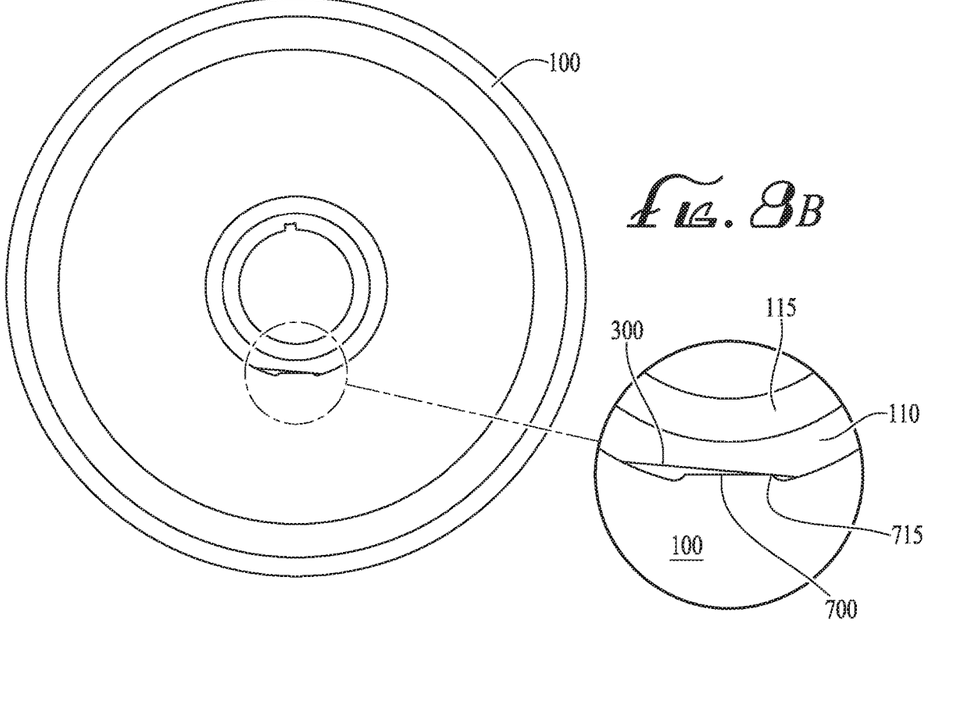
FIG. 8B is a bottom plan view of a bushing ant-rotation system of an illustrative embodiment with an exemplary diffuser pin wedged to a bushing of an illustrative embodiment.

A bushing anti-rotation wedging system of an illustrative embodiment may include a male pin integral with diffuser 100. FIG. 7 depicts a perspective view of a diffuser with an integral pin. Inner diameter 705 of diffuser 100 may form pin 700 protruding from a portion of bore 200 that may support and/or surround bushing 110. Pin 700 may extend radially inwards and may be a rectangular tab and/or protrusion from inner diameter 705. Diffuser 100 may be cast or machined to form pin 700. As illustrated in FIG. 8A, pin 700 of diffuser 100 may be positioned opposite to notch 300 of bushing 110 such that pin 700 opposes notch 300 with a slight clearance between them. In some embodiments, pin 700 and notch 300 may contact one another prior to wedging. As shown in FIG. 8A, pin 700 may include an elongate, flat outer edge 710 that parallels notch 300 when bushing 110 does not succumb to rotational forces. Should bushing 110 begin to rotate with respect to diffuser 100, notch 300 may turn out of parallel alignment with outer edge 710. Pin corner 715 (shown in FIG. 8B) of outer edge 710 (shown in FIG. 8A) may wedge pin 700 against notch 300, thereby preventing further rotation of bushing 110. As shown in FIG. 8B, bushing 110 has rotated a few degrees, wedging pin corner 715 against notch 300, which may prevent further rotation of bushing 110 by mechanical lock.

In another illustrative embodiment, rather than being integral to diffuser 100, pin 700 may be integral with bushing 110 and extend radially outward from the outer diameter of bushing 110 and extend into cavity 205 located on inner diameter 705 of diffuser 100.

An Angular Bushing Wedge

Figures 9, 10:
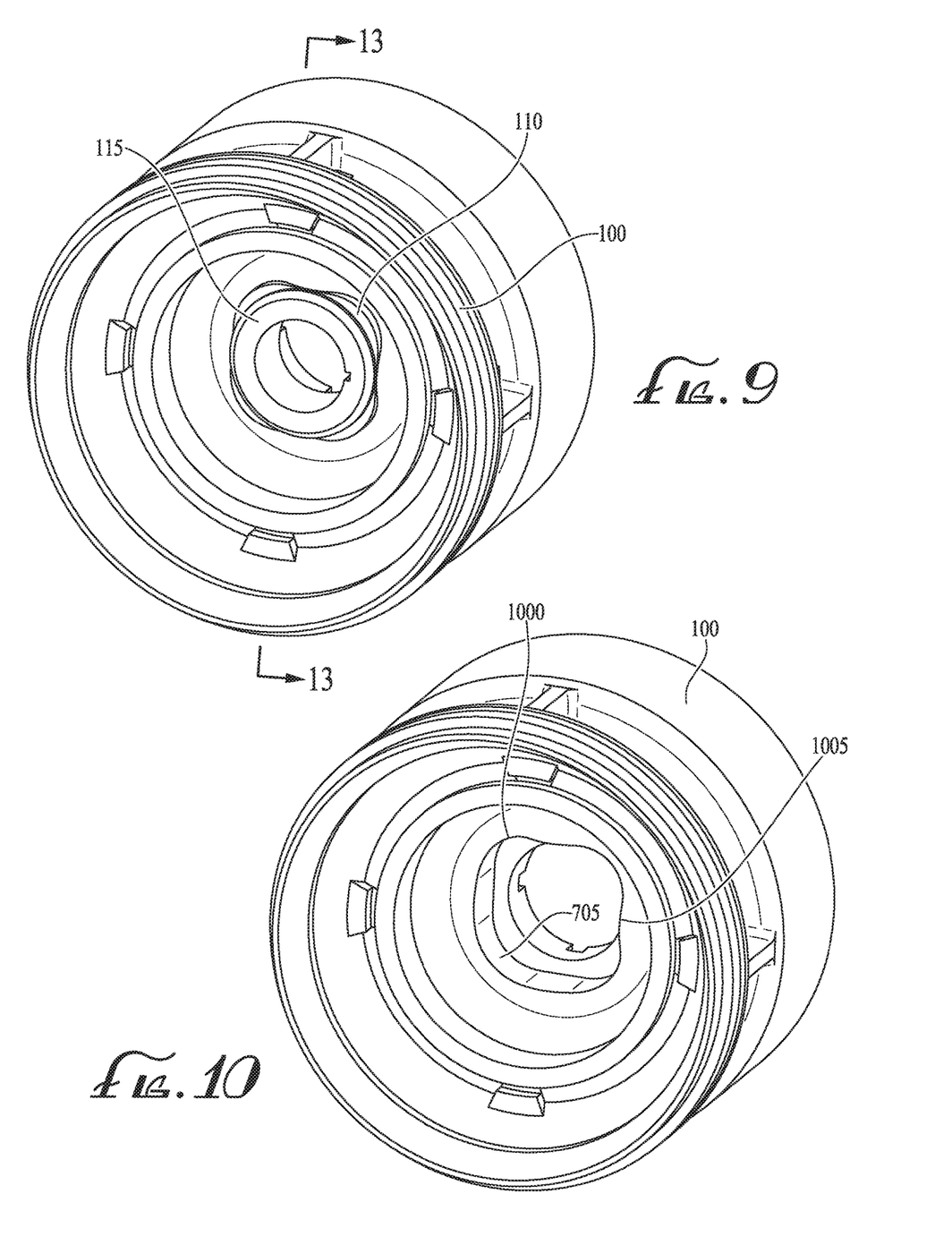
FIG. 9 is a perspective view of a square bushing anti-rotation system of an illustrative embodiment.
FIG. 10 is a perspective view of a diffuser having a squared bore of an illustrative embodiment.
Figure 11:
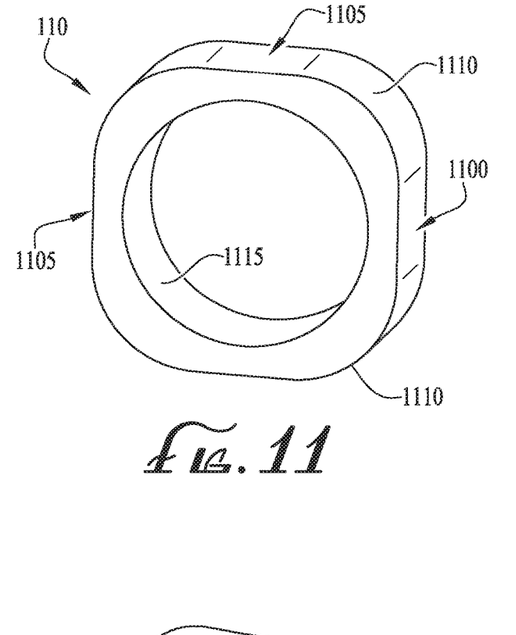
FIG. 11 is a perspective view of a squared bushing of an illustrative embodiment.
Figure 12:
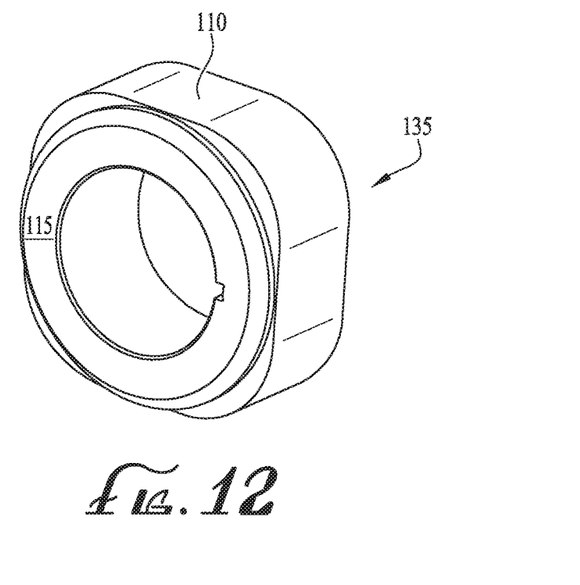
FIG. 12 is a perspective view of a squared bushing of an illustrative embodiment paired with a sleeve to form an exemplary bearing set.
Figure 13:
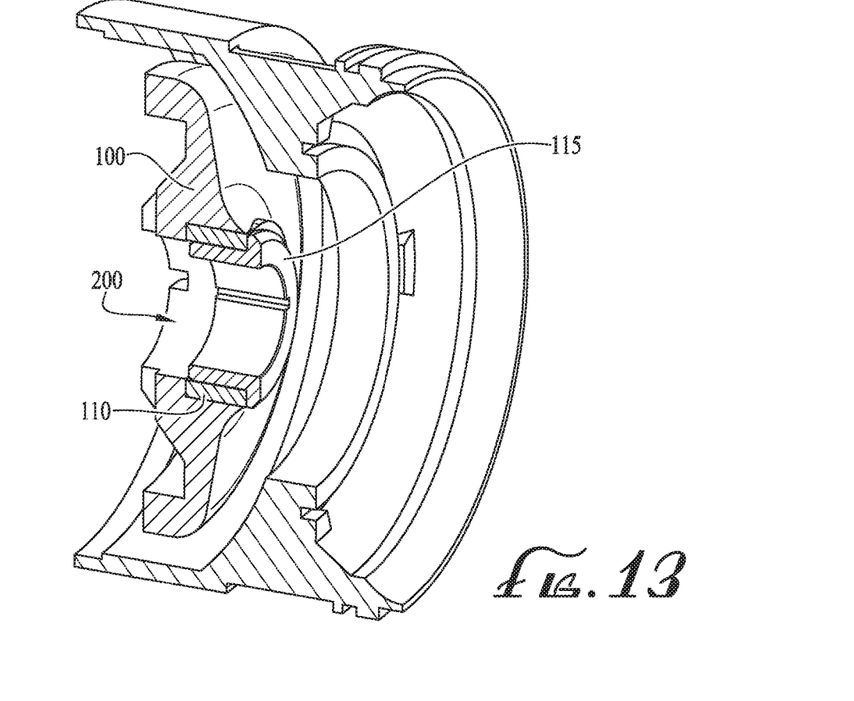
FIG. 13 is a cross sectional view across line 13-13 of FIG. 9 of a squared-bushing anti-rotation system of an illustrative embodiment.

An illustrative embodiment of a bushing anti-rotation wedge system may include a square and/or or angular bushing 110 secured within diffuser 100. Diffuser 100 may include an angular inner diameter 705 that mirrors the shape of squared bushing 110. FIG. 9 and FIG. 13 show an exemplary diffuser 100 with a square bushing 110 of an illustrative embodiment. Bushing 110 may be pressed into or otherwise secured to diffuser inner diameter 705, near, at or proximate to the bottom of diffuser bore 200. Sleeve 115, which may be a flanged sleeve, may be paired with bushing 110 to form a thrust and/or radial bearing set. Sleeve 115 may be keyed to shaft 125 and rotate with shaft 125, while bushing 110 should remain rotationally stationary as shaft 125 rotates. As shown in FIG. 11, rather than being rounded or cylindrical, outer diameter 1100 of bushing 110 may be angular, square and/or squared including flattened sides 1105 and rounded bushing corner 1110. For example, bushing 110 may include four flattened sides 1105 and four rounded bushing corners 1110 to form bushing 110 having a square-like shaped outer surface. Bushing inner diameter 1115 may remain rounded to mate with sleeve 115 and form bearing set 135, as shown in FIG. 12. Diffuser inner diameter 705 may follow the shape of bushing 110 where bushing 110 is to be pressed into or secured into bore 200 and/or form a female receptacle for bushing 110. As shown in FIG. 10, diffuser bore 200 may be formed with an angular shape that interlocks, matches and/or mates with angular bushing 110. Bore corners 1000 may mate with bushing corners 1110 and bushing flattened sides 1105 may mate with bore flattened sides 1005. Diffuser 100 may be cut, molded and/or machined to shape.

The squared and/or flattened sides 1105 of bushing 110 mated with flattened walls 1005 of diffuser bore 200 may form a mechanical lock that may wedge bushing 110 against rotation, despite rotation of sleeve 115. For example, bushing corners 1110 may wedge into bore corners 1000 should bushing 110 begin to rotate. Bearing set 135 may therefore provide thrust and/or radial support to the ESP pump, charge pump or gas separator in which stage 130 may be employed.

In some embodiments bushing 110 may be a true square with sharp bushing corners 1110. In some embodiments, bushing 110 may include more or less than four flattened sides 1005, such as shaped like a triangle, pentagon, hexagon or octagon, with rounded and/or sharp bushing corners 1110.

A Bent Retaining Ring Wedge

Figure 14:
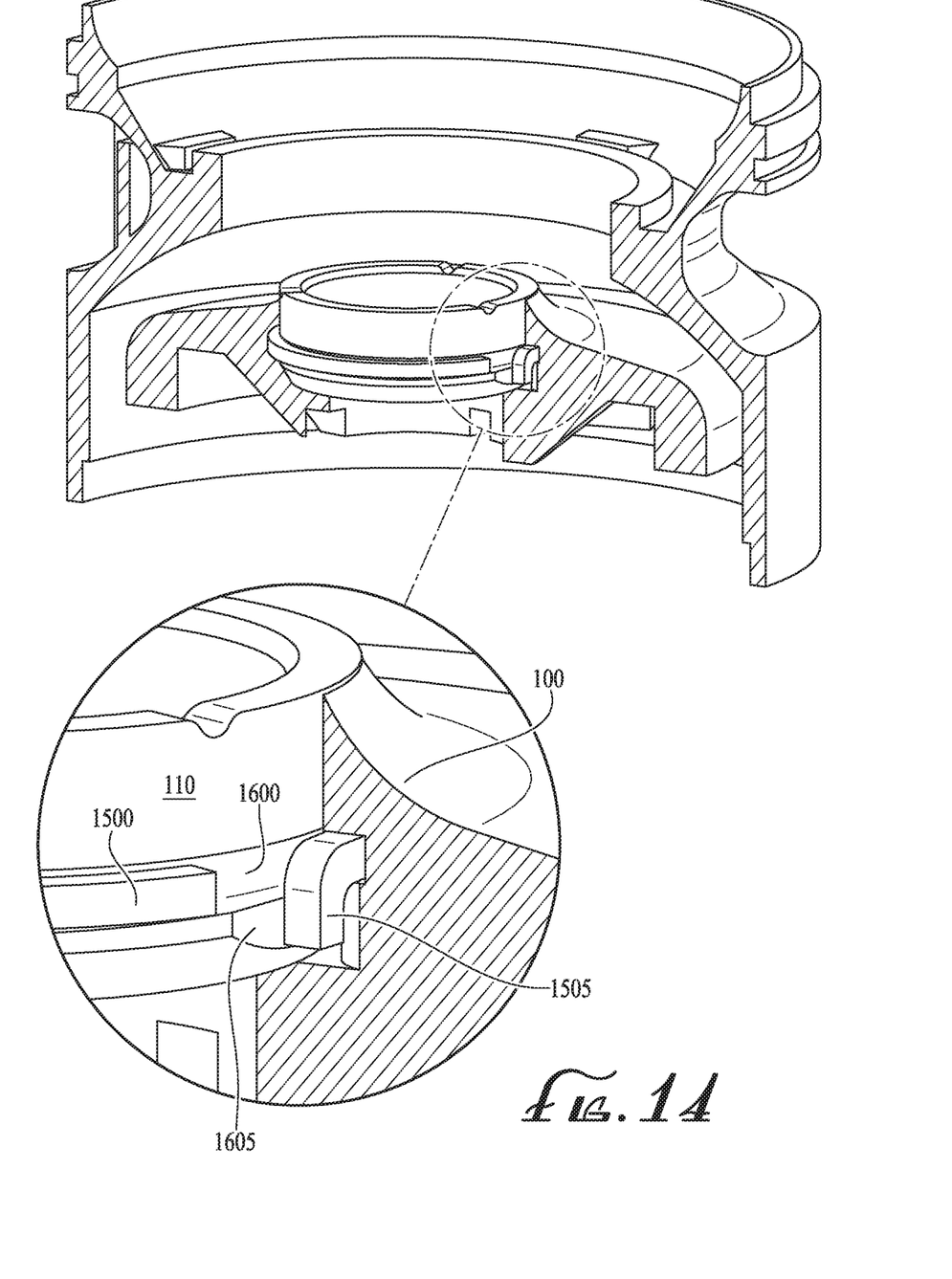
FIG. 14 is a perspective view of a bent-retaining ring bushing anti-rotation system of an illustrative embodiment.

A bushing anti-rotation wedge system may be formed by a bent retaining ring that locks bushing 110 to diffuser 100 and may prevent rotation of bushing 110. FIGS. 14-18 show a retaining ring type bushing anti-rotation system of an illustrative embodiment. Retaining ring 1500 may be steel, a nickel and copper alloy, or another hard, corrosion resistant material. Turning to FIG. 14, retaining ring 1500 may be seated inside retaining ring groove 1600 around bushing outer diameter 1100. Rather than having a conventional round or C-shape, retaining ring 1500 may be open and have at least one bent end 1505 that extends perpendicularly or about perpendicularly upwards or downwards from circumferential portion 1510 (shown in FIG. 15) of retaining ring 1500. In some embodiments, rather than having bent end 1505, retaining ring 1500 may include an axially extending mid-portion that extends from circumferential portion 1510 of retaining ring 1500.

Figure 15:
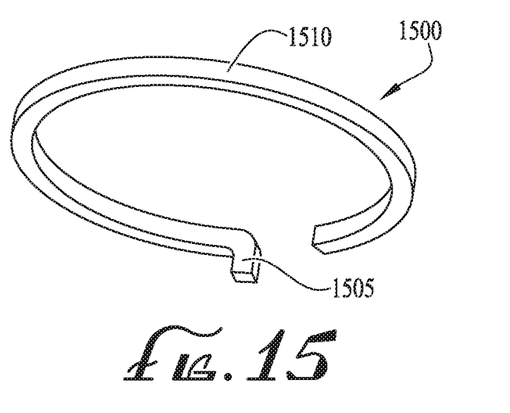
FIG. 15 is a perspective view of a bent retaining ring of an illustrative embodiment.
Figure 16:
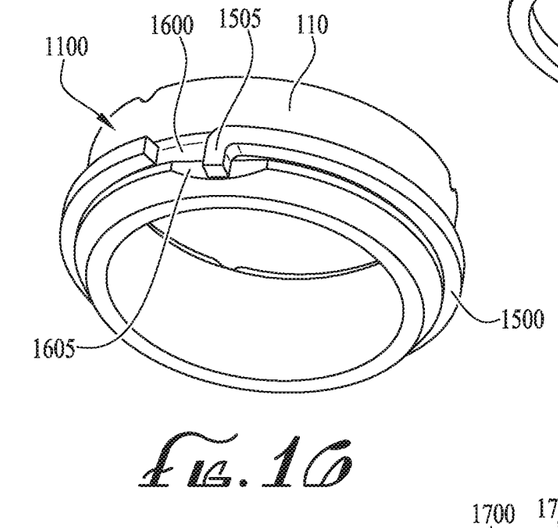
FIG. 16 is a perspective view of an exemplary bushing with seated bent retaining ring of an illustrative embodiment.

Retaining ring groove 1600 may include a cratered portion 1605 that accommodates bent end 1505 and/or wedges bent end 1605 against cratered portion 1605 and/or diffuser inner diameter 705 should bushing 110 begin to rotate. FIG. 15 illustrates an exemplary retaining ring 1500. Retaining ring 1500 may form an incomplete circle and include one or more bent ends 1505. Bent end 1505 may be 20%, 30%, 33% or another similar percentage of the height of bushing 110. Bent end 1505 may point upwards or downwards extending axially or substantially axially. As shown in FIG. 16, retaining ring 1500 may sit within retaining ring groove 1600 around bushing outer diameter 1100. Retaining ring 1500 may extend centrally around the waist of bushing 110, or may be skewed towards the top or bottom of bushing 110. As shown in FIG. 14, retaining ring 1500 is positioned around the bottom half to bottom third of bushing 110. In compliant embodiments, retaining ring 1500 may be positioned to allow for elastomeric rings 500 both above and below retaining ring 1500.

Bushing retaining ring groove 1600 may reflect the bent shape of retaining ring 1500. As shown in FIG. 16 bushing groove 1600 may extend circumferentially around outer diameter 1100 of bushing 110. In some embodiments, bushing circumferential groove 1600 may extend completely around outer diameter 1100 while retaining ring 1500 may extend only partially around the circumference of bushing outer diameter 1100. Bushing retaining ring groove 1600 may include cratered portion 1605 at and/or around bent end 1505 of retaining ring 1500. Cratered portion 1605 may be rounded, oblong and/or rectangular. Cratered portion 1605 may follow the shape of bent end 1505 or may provide a pocket into which bent end 1505 may extend. Cratered portion 1605 may be at least as deep as the length of bent end 1505.

Figure 17:
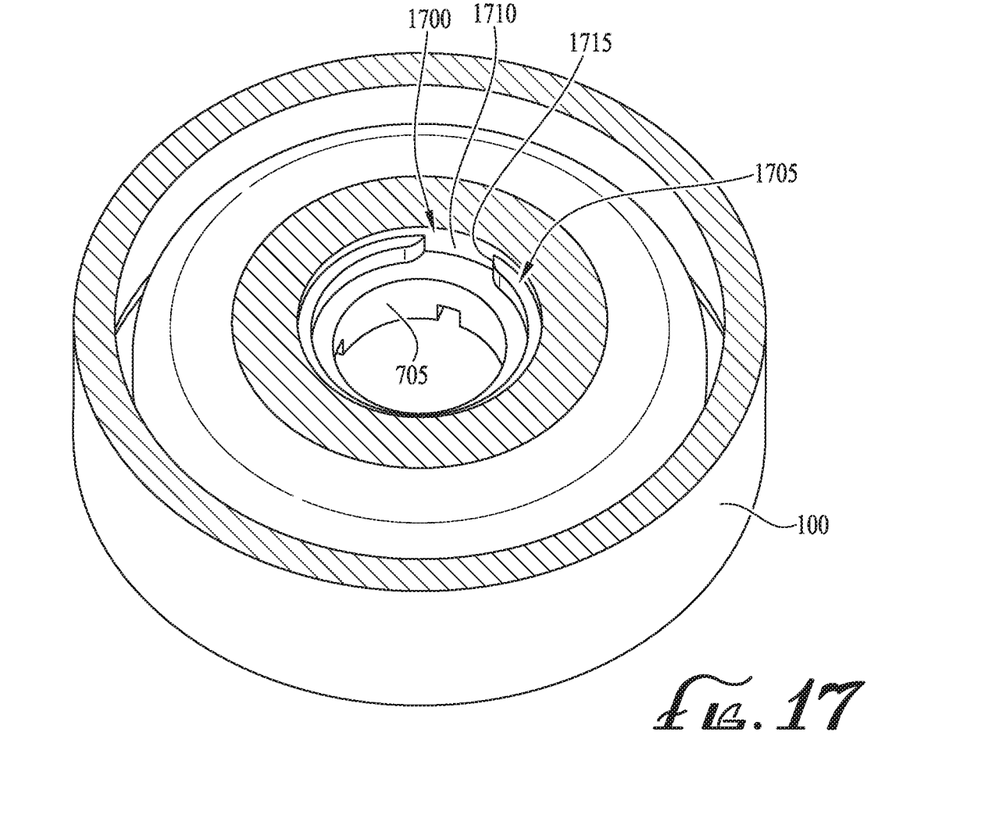
FIG. 17 is a perspective view of an exemplary diffuser with stepped retaining ring groove of an illustrative embodiment.
Figure 18:
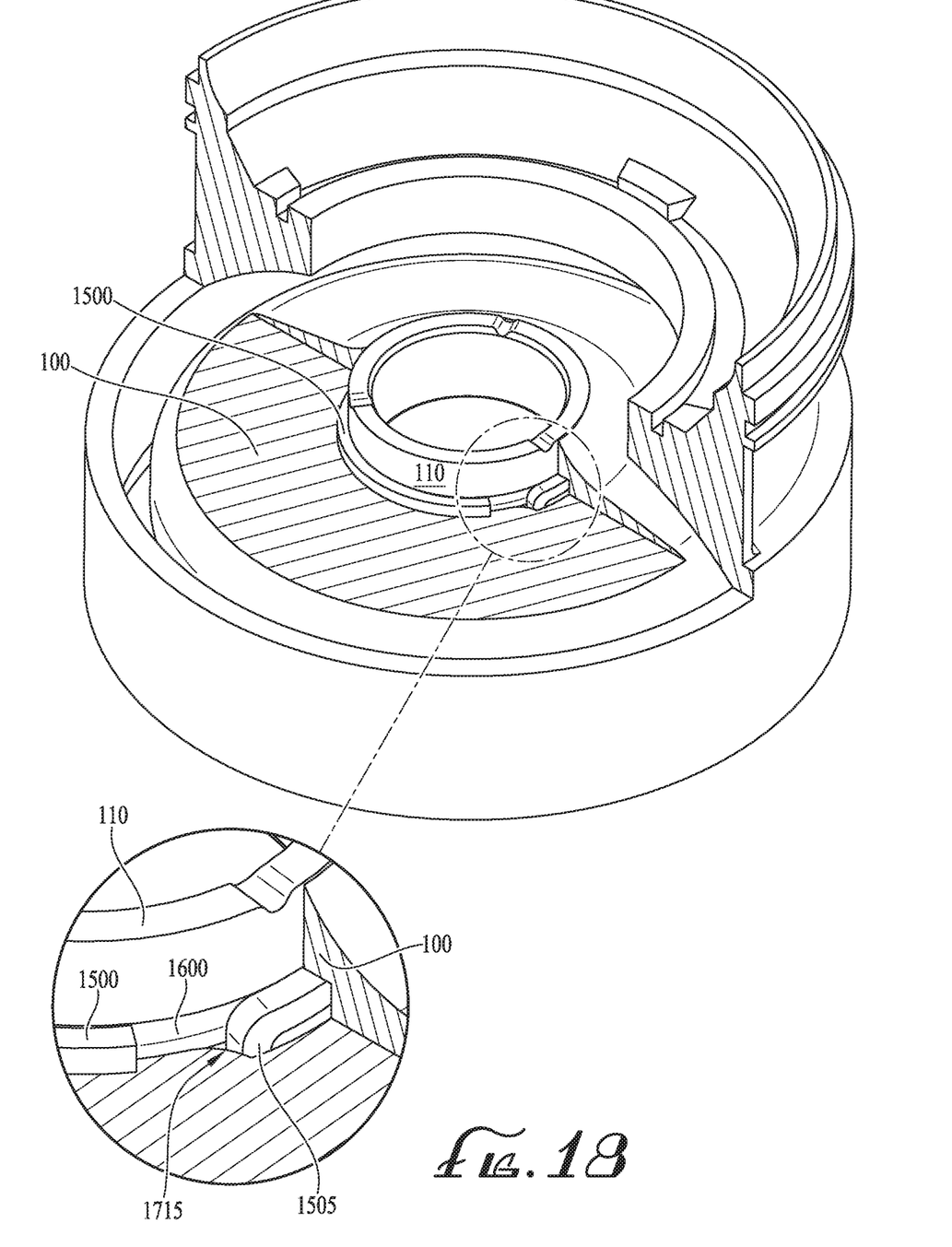
FIG. 18 is a perspective view of a bent-retaining ring type bushing anti-rotation system of an illustrative embodiment.

Turning to FIG. 17, diffuser inner diameter 705 may include a diffuser groove 1700 for retaining ring 1500 opposite bushing retaining ring groove 1600. Diffuser groove 1700 may be cast or machined and may be sized and shaped, such that together with bushing 110, diffuser 100 and bushing 110 may each seat a portion and/or one side of retaining ring 1500. Similarly to bushing retaining ring groove 1600, diffuser groove 1700 may include diffuser groove circumferential portion 1705 and stepped portion 1710. Stepped portion 1710 may extend further in an axial direction than circumferential portion 1705 to form an open space for bent end 1505. Diffuser groove circumferential portion 1705 may seat circumferential portion 1510 of retaining ring 1500, and bent end 1505 may protrude into the open space of stepped portion 1710. Bushing groove 1600 and diffuser groove 1700 may oppose and/or mirror one another at circumferential portions such that retaining ring 1500 fits tightly within both grooves 1600, 1700. Cratered portion 1605 of bushing groove 1600 may oppose stepped portion 1710 of diffuser groove 1700. Bent end 1505 may extend partially into cratered portion 1605 and partially into stepped portion 1710. As shown in FIG. 18, should bushing 110 being to rotate, bent end 1505 may abut and/or wedge against wall 1715 of stepped portion 1710, which may prevent further rotation. Wall 1715 may be an axially extending wall on diffuser inner diameter 705, formed by stepped portion 1710. The open space formed by stepped portion 1710 may be bounded on each of two sides by a pair of walls 1715.

Retaining ring 1500 embodiments of a bushing anti-rotation system may have the additional benefit of preventing or reducing axial dislodgement of bushing 110, as well as preventing or reducing rotation of bushing 110. The circumferential portion 1510 of retaining ring 1500, when positioned in the diffuser groove 1700 and bushing groove 1600, may prevent both upward and downwards movement of bushing 110 in press-fit embodiments where axial motion of bushing 110 is undesirable. The axial portion (bent end 1505) of retaining ring 1500 may prevent rotation of bushing 110 by providing a key and/or mechanical lock between bushing 110 and diffuser 100.

Illustrative embodiments may reduce the tendency to rotate of a bushing of a thrust and/or radial support bearing set of an ESP centrifugal pump assembly by providing a mechanical lock that may wedge against rotational loads. The bushing may be secured in place by wedging a key, pin, corner and/or bent end of a retaining ring between the outer diameter of bushing and inner diameter of a diffuser and may prevent ESP damage caused by failure of the thrust and/or radial bearing set. The wedge of illustrative embodiments may be activated by slight initial rotation of the bushing, and once activated may prevent further bushing rotation. Illustrative embodiments may be applied to existing components and may provide an improvement on conventional assemblies by allowing low installation and/or capital cost of ESP components. Illustrative embodiments may improve over conventional pump stage assemblies by operating over a longer period of time, at higher temperatures and with fluids with higher gas content without operation-prohibitive damage by providing a mechanical lock system for press fit bushings and/or compliant bearings in bearing sets of an ESP and allowing bearing sets to carry rotational loads as well as thrust and/or radial loads.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A bushing anti-rotation system comprising:
   a centrifugal pump stage comprising an impeller and a diffuser, the impeller secured to a rotatable shaft extending longitudinally through the centrifugal pump stage;
   the diffuser having an inner diameter defining a bore;
   a bearing set comprising:
   a bushing pressed into the inner diameter of the diffuser with an interference fit; and
   a rotatable sleeve inward of the bushing, the rotatable sleeve keyed to the rotatable shaft; and
   means for wedging the bushing against the inner diameter of the diffuser, wherein the means for wedging provides a mechanical lock against rotation of the bushing,
   wherein the means for wedging the bushing against the inner diameter of the diffuser comprises:
   a retaining ring seated around an outer diameter of the bushing;
   the retaining ring seated partially in a bushing groove and partially in a diffuser groove, the bushing groove having a cratered portion and the diffuser groove having a stepped portion, the stepped portion of the diffuser groove forming an axially extending wall of the diffuser groove;
   the retaining ring comprising a circumferential portion and at least one bent end;
   the at least one bent end extending into the cratered portion and the stepped portion; and
   the at least one bent end wedgeable against the axially extending wall of the stepped portion.

2. A bushing anti-rotation system comprising:
   a diffuser having an inner diameter defining a diffuser bore;
   the inner diameter having a first retaining groove comprising a first circumferential portion and a stepped portion, the stepped portion forming an open space bounded by a pair of axially extending groove walls;
   a bushing coupled to the inner diameter of the diffuser, the bushing having an outer diameter facing the inner diameter of the diffuser, the brushing pressed into the inner diameter of the diffuser with an interference fit;
   the outer diameter of the bushing having a second retaining ring groove comprising a second circumferential portion and a cratered portion extending axially from the second circumferential portion;
   the first retaining ring groove positioned opposite the second retaining ring groove such that the cratered portion aligns with the stepped portion;
   a retaining ring seated at least partially in the first retaining ring groove and at least partially in the second retaining ring groove;
   the retaining ring comprising at least one bent end, the at least one bent end extending at least partially into the cratered portion and at least partially into the open space; and
   the at least one bent end wedgeable against at least one axially extending wall of the pair of axially extending groove walls.

3. The bushing anti-rotation system of claim 2, wherein the at least one bent end wedged against the at least one axially extending wall creates a mechanical lock that resists rotation of the bushing by wedging an outer diameter of the bushing to an inner diameter of the diffuser.

* * * * *